United States Patent
Daley

(10) Patent No.: US 11,425,810 B1
(45) Date of Patent: Aug. 23, 2022

(54) SMART LIGHTING CONTROL SYSTEM

(71) Applicant: Neopod LLC, Pittsburgh, PA (US)

(72) Inventor: Robert Daley, Pittsburgh, PA (US)

(73) Assignee: Neopod LLC, Pittsburgh, PA (US)

( * ) Notice: Subject to any disclaimer, the term of this patent is extended or adjusted under 35 U.S.C. 154(b) by 74 days.

(21) Appl. No.: 16/824,929

(22) Filed: Mar. 20, 2020

Related U.S. Application Data

(60) Provisional application No. 62/821,030, filed on Mar. 20, 2019.

(51) Int. Cl.
| | |
|---|---|
| *H05B 47/19* | (2020.01) |
| *H04L 67/12* | (2022.01) |
| *H05B 45/10* | (2020.01) |
| *H05B 47/11* | (2020.01) |
| *H05B 45/20* | (2020.01) |

(52) U.S. Cl.
CPC ............ *H05B 47/19* (2020.01); *H04L 67/12* (2013.01); *H05B 45/10* (2020.01); *H05B 45/20* (2020.01); *H05B 47/11* (2020.01)

(58) Field of Classification Search
CPC ........ H05B 45/10; H05B 45/20; H05B 47/10; H05B 47/11; H05B 47/19; H04L 67/12
See application file for complete search history.

(56) References Cited

U.S. PATENT DOCUMENTS

| | | | |
|---|---|---|---|
| 6,528,954 B1 | 3/2003 | Lys et al. | |
| 9,635,740 B2 | 4/2017 | Sun et al. | |
| 9,706,183 B2* | 7/2017 | Hochman | H05B 45/20 |
| 9,839,089 B1* | 12/2017 | Wang | G06F 3/04847 |
| 9,894,471 B1* | 2/2018 | Zalewski | H04W 76/10 |
| 10,039,174 B2 | 7/2018 | Oliver et al. | |
| 10,085,328 B2 | 9/2018 | Barna | |
| 10,141,739 B1* | 11/2018 | Davis | H02J 5/00 |
| 10,531,545 B2 | 1/2020 | Barna et al. | |
| 10,958,457 B1* | 3/2021 | Davis | G10L 17/00 |
| 2007/0043540 A1* | 2/2007 | Cleland | H05B 47/19 702/188 |
| 2009/0278479 A1* | 11/2009 | Platner | H05B 47/11 315/312 |
| 2010/0241255 A1* | 9/2010 | Benetz | H05B 47/19 700/90 |
| 2013/0043809 A1* | 2/2013 | Weaver | H05B 45/12 315/297 |
| 2013/0234625 A1 | 9/2013 | Kondo et al. | |

(Continued)

FOREIGN PATENT DOCUMENTS

JP 2014020790 2/2014

*Primary Examiner* — Abdullah A Riyami
*Assistant Examiner* — Syed M Kaiser
(74) *Attorney, Agent, or Firm* — K&L Gates LLP

(57) ABSTRACT

Systems and methods to configure and control a smart lighting system via a hub are disclosed herein. In one aspect, a hub can assign a smart light device to a group of smart light devices based on a physical location of the smart light device. The group of smart light devices can correspond to a control profile including default and/or custom parameters to control the smart light device. The hub can automatically assign the smart light device to a group upon connection to the hub or can prompt assignment via a mobile device. In another aspect, the hub can track the usage of lights in a group and adjust the parameters based at least in part on the tracked usage.

24 Claims, 8 Drawing Sheets

(56) References Cited

U.S. PATENT DOCUMENTS

| | | | |
|---|---|---|---|
| 2014/0354160 A1 | 12/2014 | Aggarwal et al. | |
| 2015/0048742 A1* | 2/2015 | Wingren | H05B 47/11 |
| | | | 315/152 |
| 2016/0227633 A1 | 8/2016 | Sun et al. | |
| 2016/0278187 A1* | 9/2016 | Amer | H05B 47/19 |
| 2016/0366346 A1* | 12/2016 | Shin | G06K 9/00771 |
| 2017/0098354 A1* | 4/2017 | Loeb | H04W 4/70 |
| 2017/0231053 A1* | 8/2017 | Underwood | H05B 45/3725 |
| 2017/0241200 A1* | 8/2017 | Feldstein | H04L 12/283 |
| 2017/0295630 A1* | 10/2017 | Lark, Jr. | H05B 45/10 |
| 2017/0309142 A1* | 10/2017 | Phillips | G08B 7/066 |
| 2019/0097421 A1* | 3/2019 | Davis | H02J 5/00 |
| 2019/0101687 A1* | 4/2019 | Rosen | G02B 6/0041 |
| 2019/0130671 A1* | 5/2019 | Dillow | G07C 5/0841 |
| 2019/0349213 A1* | 11/2019 | Shive | G06N 5/025 |
| 2020/0286604 A1* | 9/2020 | Wingren | G16H 10/60 |
| 2021/0112647 A1* | 4/2021 | Coleman | F21V 14/02 |

\* cited by examiner

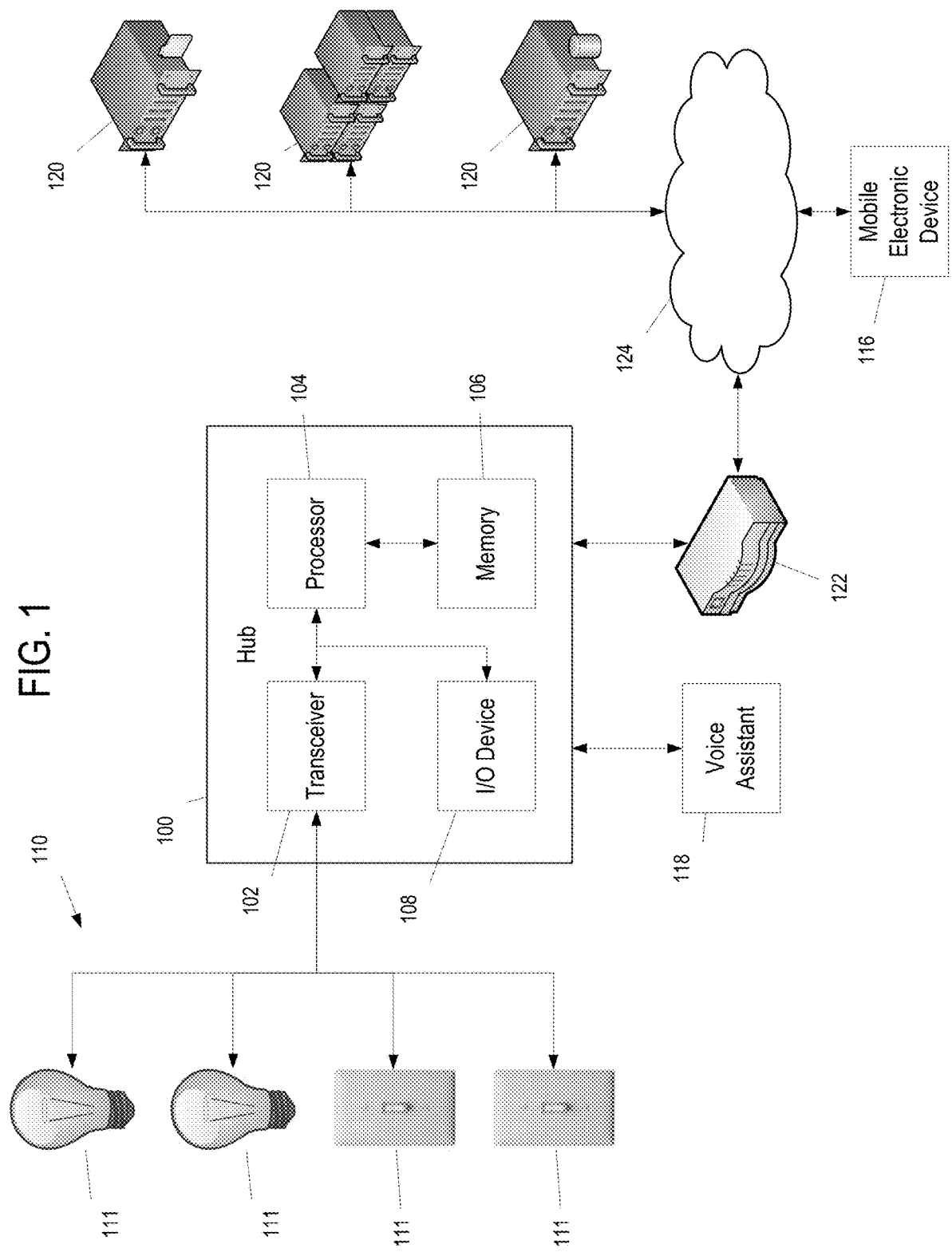

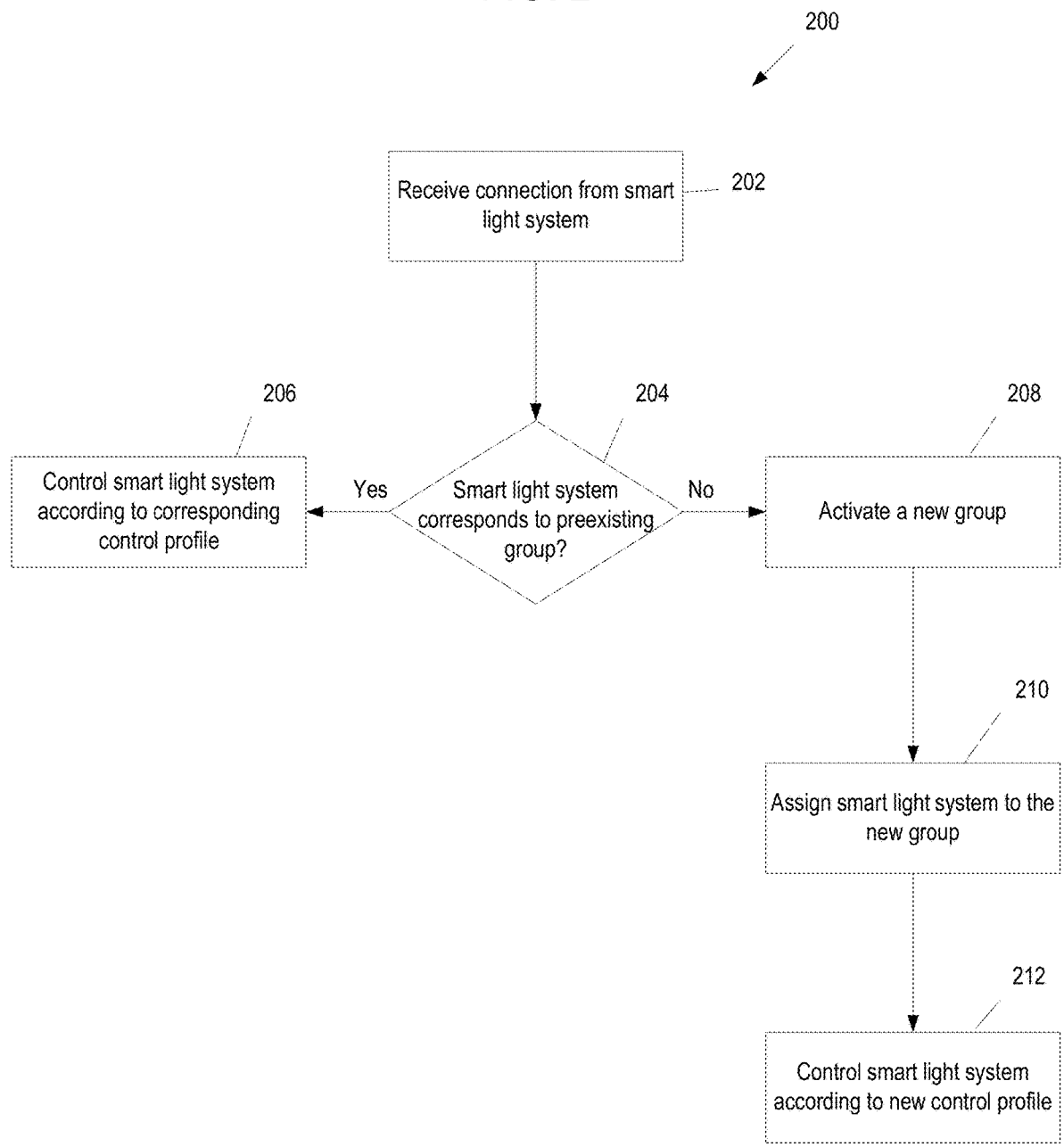

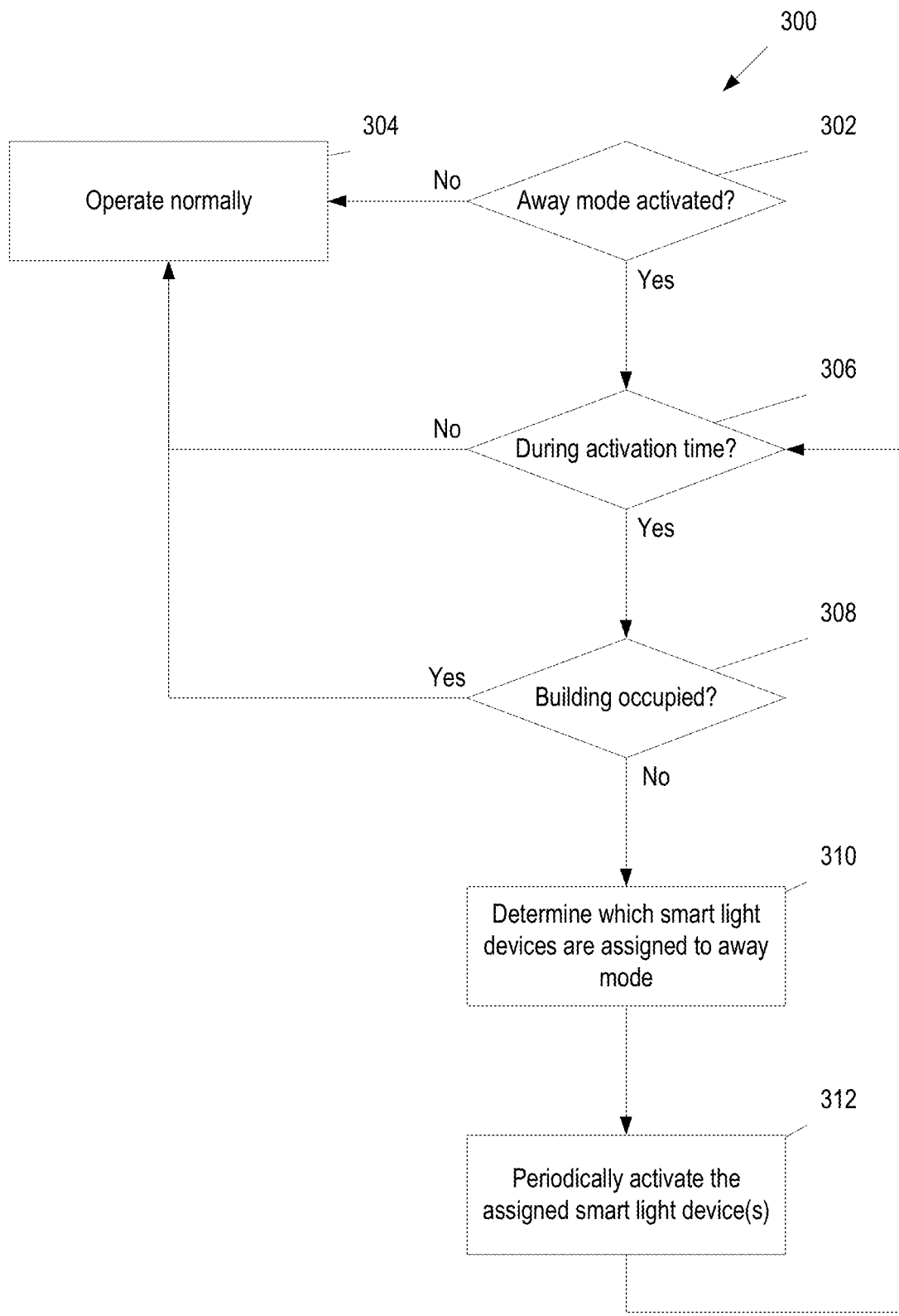

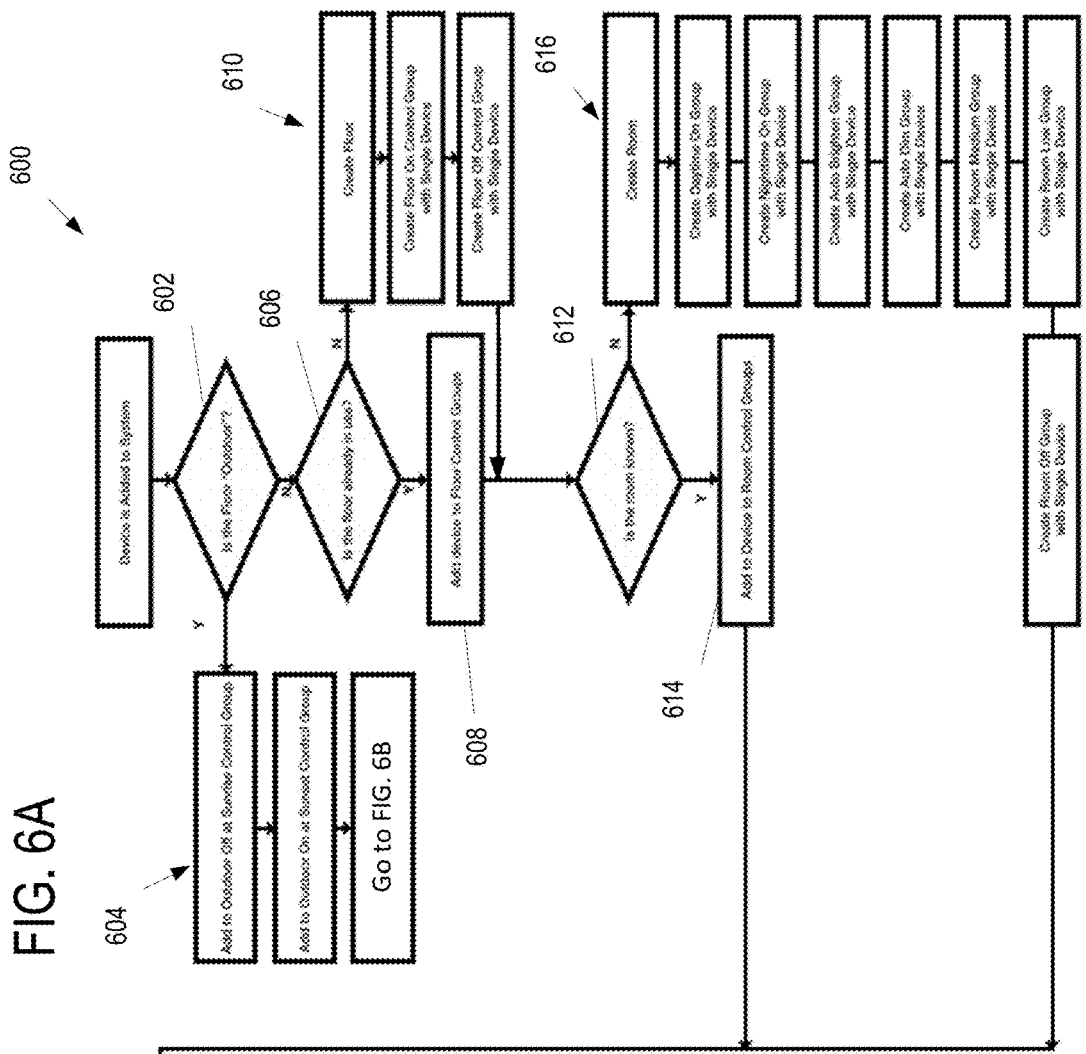
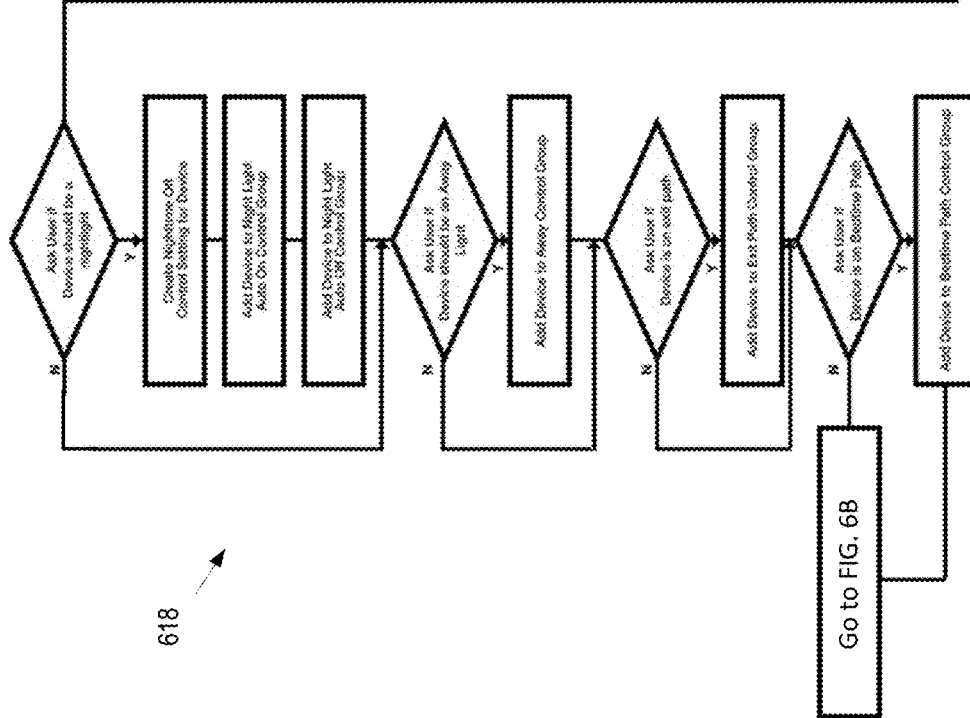
FIG. 6A

SMART LIGHTING CONTROL SYSTEM

PRIORITY CLAIM

The present application claims priority to U.S. provisional patent application Ser. No. 62/821,030, filed Mar. 20, 2019, having the same inventor and title as above, and which is incorporated herein by reference.

BACKGROUND

With enough effort, smart lighting control systems can be programmed to perform a range of different functions; however, programming such smart lighting control systems requires a significant amount of meaningful experience and a substantial time investment each time a new smart lighting control system is installed because of the number of features that must be customized for each home or building. In particular, these smart lighting control systems require the creation of custom fields and corresponding control logic for controlling the smart light devices that are static and must be manually updated by the user.

SUMMARY

In one general aspect, the present invention is directed to computer-implemented smart lighting control systems and methods for configuring a smart light device. In various embodiments, the system and methods automatically program or configure a newly installed smart lighting device with at least a set of base or default features in order to reduce the amount of new programming that must be performed each time a new smart lighting device is installed. The method can include, according to various embodiments, receiving, by a hub, a connection from the smart light device and determining, by the hub, whether the smart light device corresponds to a first group. The method further includes controlling, by the hub, the smart light device according to a first light control profile corresponding to the first group. The method can further include: creating, by the hub, a second group; assigning, by the hub, the smart light device to the second group; and controlling, by the hub, the smart light device according to a second light control profile corresponding to the second group. The first and second light control profiles may be one of multiple light control profiles associated with their respective groups.

In another general aspect, the present invention is directed to a computer-implemented method for controlling a plurality of smart light devices associated with a building. The method can include determining, by a hub connectable to the plurality of smart light devices, whether a current time is within an activation time period. The method can further include determining, by the hub, whether the building is occupied. The method can still further include activating, by the hub, one or more of the smart light devices according to whether the current time is within the activation time period and whether the building is unoccupied. Whether the building is occupied can be determined via, for example, determining whether at least one of the smart light devices has been manually activated or whether movement within the building is sensed via a sensor assembly communicably coupled to the hub.

In yet another general aspect, the present invention is directed to a computer-implemented method for controlling a smart light device. The method can include determining, by a hub connectable to the smart light device, whether the smart light device is at an off brightness and causing, by the hub, the smart light device to dim by a predetermined brightness amount over a predetermined number of iterations until the smart light device is at the off brightness according to whether the smart light device was not at the off brightness.

In yet another general aspect, the present invention is directed to a computer-implemented method for controlling a smart light device. The method can include determining, by a hub connectable to the smart light device, whether the smart light device is at a threshold brightness and causing, by the hub, the smart light device to brighten by a predetermined brightness amount over a predetermined number of iterations until the smart light device is at the threshold brightness according to whether the smart light device was not at the threshold brightness.

In still yet other general aspects, the present invention is directed to systems for performing the described processes. The systems can include a hub that includes a transceiver that can connect to various smart light devices via a wireless communication protocol, a memory for storing processes embodied as computer-executable instructions, and a processor for executing the instructions.

In another general aspect, the present invention is directed to a computer-implemented method for controlling a plurality of smart light devices. The method can include the hub automatically creating one or more control profiles for a group and the hub automatically executing different control profiles based upon external factors, such as time of day, date, or temperature, in response to simple user commands, such as instructing a light to be turned on, turned off, brightened, or dimmed.

These and other benefits of the present invention will be apparent from the description that follows.

FIGURES

The features of various aspects are set forth with particularity in the appended claims. The various aspects, however, both as to organization and methods of operation, together with further objects and advantages thereof, may best be understood by reference to the following description, taken in conjunction with the accompanying drawings as follows.

FIG. 1 is a block diagram of a hub for controlling a smart lighting system, in accordance with at least one aspect of the present disclosure.

FIG. 2 is a logic flow diagram of a process for configuring a smart light device, in accordance with at least one aspect of the present disclosure.

FIG. 3A is a logic flow diagram of a process for controlling a smart light device according to an away mode, in accordance with at least one aspect of the present disclosure.

FIG. 6A is a first portion of a logic flow diagram of a process for configuring a smart light device, in accordance with at least one aspect of the present disclosure.

DESCRIPTION

Figure 3B:
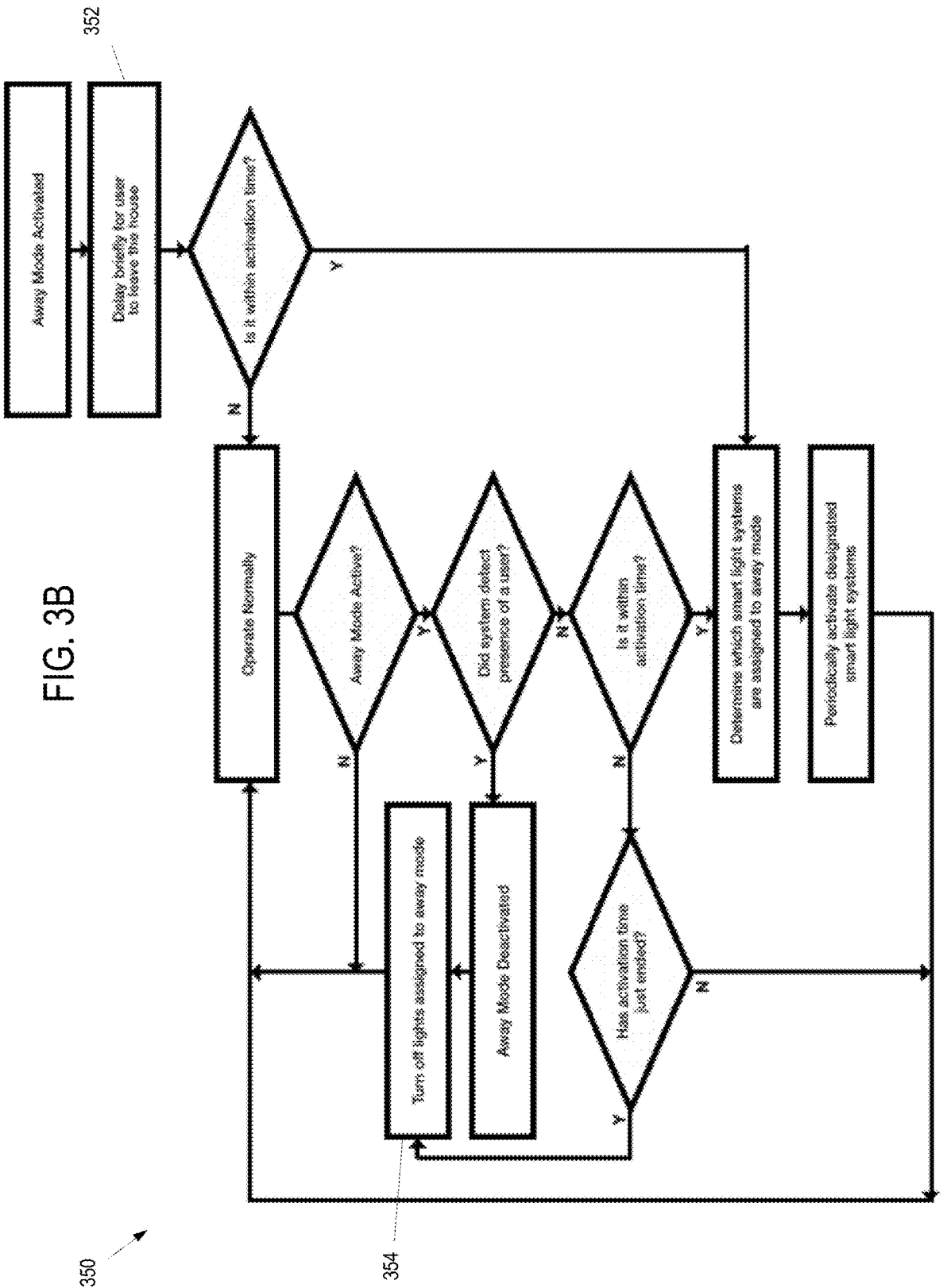
FIG. 3B is another logic flow diagram of a process for controlling a smart light device according to an away mode, in accordance with at least one aspect of the present disclosure.

Certain aspects will now be described to provide an overall understanding of the principles of the structure, function, manufacture, and use of the devices and methods disclosed herein. One or more examples of these aspects are illustrated in the accompanying drawings. Those of ordinary skill in the art will understand that the devices and methods specifically described herein and illustrated in the accompanying drawings are non-limiting example aspects and that the scope of the various aspects is defined solely by the claims. The features illustrated or described in connection with one aspect may be combined with the features of other aspects. Such modifications and variations are intended to be included within the scope of the claims.

Furthermore, unless otherwise indicated, the terms and expressions employed herein have been chosen for the purpose of describing the illustrative aspects for the convenience of the reader and are not to limit the scope thereof.

Smart Lighting Control System Configuration

FIG. 1 is a block diagram of a hub 100 for controlling smart lighting system 110, in accordance with at least one aspect of the present disclosure. The hub 100 can include, for example, an Internet-of-Things (IoT) hub that is programmed to control various smart devices or other IoT assets, such as smart light devices 111, in home, office, or industrial environments. The hub 100 can include a wireless transceiver 102, a processor 104 coupled to the transceiver 102, and a memory 106 coupled to the processor 104. The wireless transceiver 102 can utilize a variety of different wireless communication protocols, including home automation wireless communication protocols, such as Z-Wave or ZigBee, or general wireless communication protocols, such as Bluetooth or to communicate with remote wireless devices, such as the smart light devices 111. The hub 100 can be communicatively coupled, via the wireless transceiver 102, to a smart lighting system 110 to form, for example, a Home Area Network (HAN). The smart lighting system 110 can include one or more smart light devices 111, such as smart light bulbs, smart light switches, smart electrical outlets, and other smart devices for controlling lights or lighting within or associated with a structure (e.g., a home or office). The hub 100 and the smart light devices 111 can be configured in a number of different communication relationships through the HAN or another such network. For example, the hub 100 and the smart light devices 111 can be configured to form a master-slave relationship, where the smart light devices 111 are unidirectionally controlled by the hub 100. Further, in some aspects, the network formed by the hub 100 and the smart light devices 111 can include a mesh network. In a mesh network, a group of nodes making up a network executing mesh networking protocols cooperate to dynamically pass data between each other to deliver the data from an origin to a destination. This allows data to be delivered from an origin to a destination that may be out of direct broadcast range of the origin. Accordingly, the smart light devices 111 and/or other nodes of the network can be configured to relay messages between the hub 100 and smart light devices 111 that may be out of direct communication range of the hub 100 via mesh networking protocols.

The hub 100 can further include an I/O device 108, such as a speaker and/or a touchscreen display, for providing alerts or queries to a user and receiving commands or answers from the user. In some aspects, the hub 100 can be communicably connectable to mobile devices 116 (e.g., smartphones or tablets), voice-controlled intelligent personal assistant devices 118 (e.g., an Amazon Echo speaker with the Alexa virtual assistant), and other user devices for controlling or communication with the hub 100. For example, a mobile device 116 can include an app programmed to pair with the hub 100, view settings associated with the smart light devices 111 that are connected to the hub 100, receive push notifications of other alerts generated by the hub 100, and so on. As another example, a voice-controlled intelligent personal assistant device 118 can be programmed to receive vocal commands from users to control the hub 100, relay queries or alerts from the hub 100, and so on. Such user devices can be directly connected to the hub 100 (i.e., part of the hub network), connected to the hub 100 via the Internet 124 through a router 122 or another networking device, and so on. In one aspect, the hub 100 can be communicably connected to one or more remote servers 120 (e.g., a database server, an application server, a file server, or other types of servers and combinations thereof) via the Internet 124 or another communication network. The hub 100 can retrieve software updates, user profile or account settings, and other such data from the remote servers 120. In one aspect, the remote servers 120 can provide cloud computing services. The cloud computing services can receive data from the hub 100, execute various processes or algorithms based upon the received data (some of which may include the processes described below), and then transmit the corresponding control adjustments to the hub 100, which then proceeds to control the smart lighting system 110 accordingly.

In one aspect, the hub 100 can be configured to store control profiles associated with groups of smart light devices 111. As used herein, the term "control profile" can refer to the set of parameters and/or settings dictating how a smart light device 111 is controlled by the hub 100. In one implementation, the hub 100 can be programmed to store a database entry for each smart light device 111 connected to the hub 100, and a control profile can include a particular set of values for the fields in a smart light device database entry. An illustrative database structure is shown in TABLE 1. The groups can correspond to, for example, rooms (e.g., living room, kitchen, or bedroom), floors (e.g., basement, first floor, or second floor), general locations (e.g., indoors or outdoors), and/or combinations thereof for a building. The hub 100 can jointly control all of the smart light devices 111 assigned to a particular group according to a control profile associated with that group. In one aspect, the hub 100 can store multiple control profiles associated with a group and can select one of the control profiles by which to control a particular smart light device 111. For example, a group stored by the hub 100 could be defined as the first-floor living room. The hub 100 could thus further store one or more control profiles associated with the first-floor living room group, and each smart light device 111 assigned to that group would be controlled according to the first-floor living room control profile(s). In another aspect, a particular smart light device 111 can be assigned to multiple groups (e.g., the first-floor group and the living room group), and thus, multiple control profiles associated with the assigned groups can be applied to the particular smart light device 111.

Figure 6B:
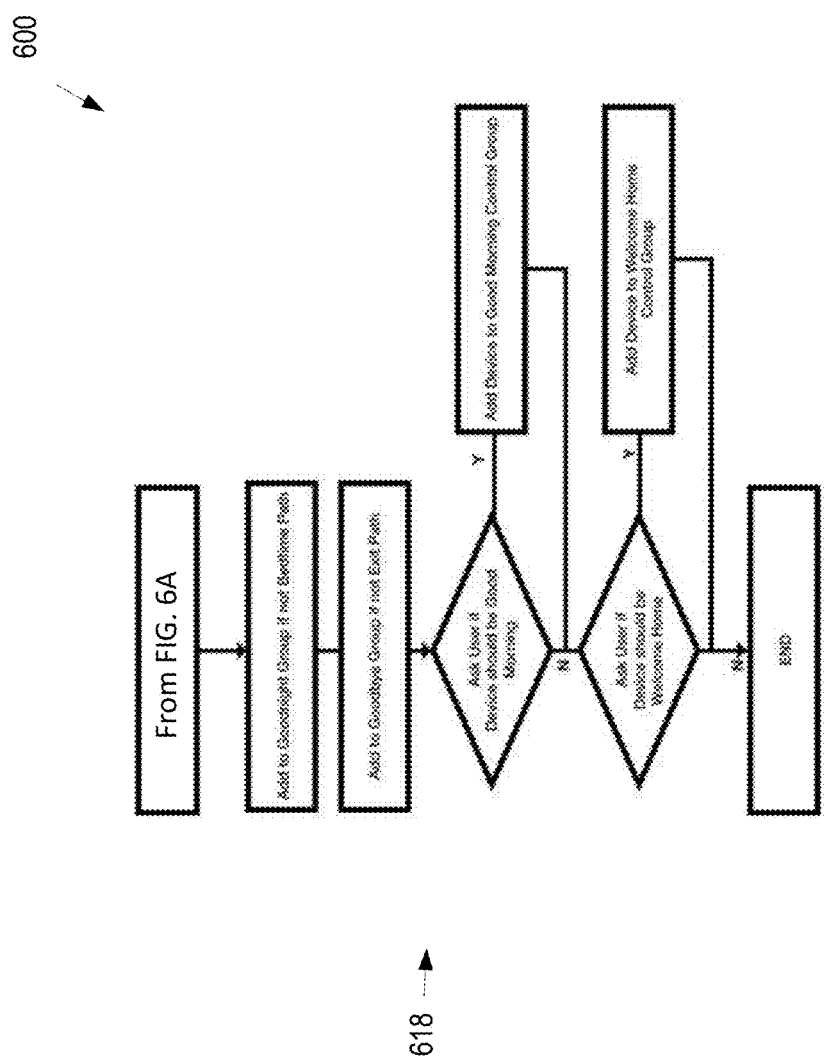
FIG. 6B is a second portion of the logic flow diagram of FIG. 6A, in accordance with at least one aspect of the present disclosure.

In one aspect, the hub 100 can be configured to automatically assign a smart light device 111 to a group upon the smart light device 111 first connecting to the hub 100. Once assigned to a group, a control profile associated with the group can then be applied to the newly connected smart light device 111. Accordingly, each smart light device 111 that is newly connected to the hub 100 can be automatically controlled in a manner that is appropriate for the location of the smart light device 111, without the need for the user to individually program every single parameter for each smart light device 111. The hub 100 can be configured to establish which control profile should be applied to a newly connected smart light device 111 during an initial setup process. In various aspects, the hub 100 can be programmed to determine what group the smart light device 111 should be assigned to and whether any additional modes should be implemented for the smart light device 111 by asking the user a series of queries about the newly connected smart light device 111 when the hub 100 detects its presence. The hub 100 can provide the queries to the user via an I/O device 108 of the hub 100, a voice-controlled intelligent personal assistant device 118 connected to the hub 100, or an app being executed on a mobile device 116 associated with the user, for example. Examples of setup processes for smart light devices 111 are illustrated in FIGS. 2 and 6A-6B and described in greater detail below.

In one aspect, the hub 100 can be programmed to track users' usage of smart light devices 111. In this aspect, the hub 100 can utilize algorithmic or machine learning techniques to ascertain patterns in users' behaviors and then update the control profiles for the smart light devices 111 (or groups of smart light devices 111) according to the behavior patterns exhibited by the users. In one aspect, the hub 100 can automatically implement any such control profile updates. In another aspect, the hub 100 can provide a user prompt (e.g., a vocal query or a push notification) for the user to confirm whether he or she wishes to implement the proposed control profile update. For example, the hub 100 can determine that the smart light devices 111 assigned to the kitchen group are manually activated by the user at or near 5:30 p.m. more often than a threshold rate (e.g., more often than three out of every five days) and then provide a user prompt suggesting that the hub 100 automatically activate the smart light devices 111 assigned to the kitchen group each day at 5:30 p.m. If the user accepts the proposal, the hub 100 can then update the control profile for the kitchen group accordingly. Thereafter, the hub 100 will automatically activate each smart light device 111 currently or subsequently assigned to the kitchen group at the designated time.

In one aspect, the memory 106 of the hub 100 can include a database storing a database entry corresponding to each smart light device 111 that is connected to the hub 100. The parameters in the database entries for each of the smart light devices 111 can dictate how the hub 100 controls each of the smart light devices 111, including the brightness and other settings that the smart light device 111 is set to, whether and how the smart light device 111 is controlled via various processes (modes) executed by the hub 100, and so on. Further, the control profiles can be represented as a data structure that can be stored in a database. Accordingly, during the setup process for a smart light device 111, the control profile for the group(s) to which the smart light device 111 is assigned can be applied as a template to the database entry for the smart light device 111. In other words, the fields of the database entry for the newly connected smart light device 111 can be initially populated with the template values associated with the assigned control profile. In some aspects, users can customize the function of each individual smart light device 111 by issuing commands to the hub 100 and/or responding to queries from the hub 100, which can then cause the hub 100 to update the database fields for the smart light device 111 to adjust how the particular smart light device 111 is controlled by the hub 100. An illustrative data structure for storing these and other control parameters associated with each smart light device 111 and example values for the parameters are provided below in Table 1.

TABLE 1

| Data Fields | Example Values |
| --- | --- |
| Group | Dining Room/Second Floor Bedroom/Kitchen/Outdoors |
| Daytime On Brightness | 10/100% |
| Daytime Medium Brightness | 8/80% |
| Daytime Low Brightness | 4/40% |
| Daytime Off Brightness | 0/0% |
| Nighttime On Brightness | 7/70% |
| Nighttime Medium Brightness | 5/50% |
| Nighttime Low Brightness | 3/30% |
| Nighttime Off Brightness | 1/10% |
| Color Temperature | 2800 K/warm white |
| Daytime Auto On | Y/Enabled/1/N/Not enabled/0 |
| Daytime Auto Off | Y/Enabled/1/N/Not enabled/0 |
| Nighttime Auto On | Y/Enabled/1/N/Not enabled/0 |
| Nighttime Auto Off | Y/Enabled/1/N/Not enabled/0 |
| Away Mode | Y/Enabled/1/N/Not enabled/0 |
| Sleep Mode | Y/Enabled/1/N/Not enabled/0 |
| Wake Mode | Y/Enabled/1/N/Not enabled/0 |
| Exit Path | Y/Enabled/1/N/Not enabled/0 |
| Bedroom Path | Y/Enabled/1/N/Not enabled/0 |
| Morning Light | Y/Enabled/1/N/Not enabled/0 |

Smart Lighting Control System Setup

In various aspects, each smart light device 111 can go through a configuration or setup process upon being initially connected to the hub 100. As part of this configuration process, the hub 100 can apply a control profile to the smart light device 111 that corresponds to the group(s) to which the smart light device 111 is assigned by the user and/or hub 100, enable various modes for the smart light device 111, and so on. FIG. 2 and FIGS. 6A-6B illustrate examples of such setup processes. The process 200 of FIG. 2, the process 600 of FIGS. 6A-6B, and other processes described herein can be executed by hardware, software, and/or firmware of a computer system, such as the processor 104 of the hub 100. Accordingly, the processes 200, 600 can be embodied as a set of computer-executable instructions stored in a memory 106 that, when executed by the processor 104, cause the computer system (e.g., the hub 100) to perform the described steps. Further, each described step in the processes 200, 600 can be representative of one or multiple software modules programmed to cause the hub 100 to perform that particular step. Still further, although the processes 200, 600 are described as being executed by a processor 104, this is merely for brevity, and it should be understood that the depicted process 200 can also be executed across multiple computers that are communicably connected as a distributed computer system for performing the recited steps, such as in a cloud computing architecture (e.g., cloud computing services provided by a remote server 120).

FIG. 2 is a logic flow diagram of a process 200 for configuring a smart light device 111, in accordance with at least one aspect of the present disclosure. In one general implementation, the illustrated process 200 is provided to detect when a new smart light device 111 has connected to the hub 100 and determine whether the new smart light device 111 should be assigned to a preexisting group controlled according to a particular set of parameters. If the new smart light device 111 does correspond to a preexisting group, then, according to various embodiments, it is controlled according to the parameters or control profile corresponding to that group. If the new smart light device 111 does not correspond to a preexisting group, then, according to various embodiments, a new group is created or retrieved from a memory 106, and the new smart light device 111 is controlled according to the parameters or control profile corresponding to the new group. For example, if the hub 100 has pre-established a group corresponding to a living room and an associated control profile for controlling smart light devices 111 present in that room, when a new smart light device 111 connects to the hub 100, the hub 100 can determine whether the new smart light device 111 is present in the living room or otherwise belongs to the living room group. If the new smart light device 111 is present in the living room or otherwise belongs to the living room group, then the hub 100 can control the smart light device 111 according to the living room control profile (e.g., by applying the living room control profile to the database entry for the newly connected smart light device 111). If the new smart light device 111 is not present in the living room or otherwise does not belong to the living room group, then the hub 100 can establish a new group (e.g., a kitchen group if the new smart light device 111 is present in the kitchen) and control the new smart light device 111 according to a new control profile corresponding to the new group.

Accordingly, at a first step 202, a hub 100 executing the process 200 receives a connection from a smart light device 111. A smart light device 111 can connect to the hub 100 by, for example, transmitting a handshake message to the hub 100 via the wireless network protocol used by the hub 100 (e.g., Z-Wave), which is then confirmed and accepted by the hub 100 to communicably connect the smart light device 111 to the hub 100. In one aspect, each smart light device 111 can be communicably connected to a single controller or hub 100.

Accordingly, at a second step 204, the hub 100 determines whether the smart light device 111 corresponds to a preexisting or currently active group. In one aspect, the hub 100 can determine whether the smart light device 111 corresponds to a preexisting group by receiving input from the user, such as by asking the user where the smart light device 111 is or will be located via a speaker or another such I/O device 108. In one aspect, the hub 100 can include a voice-recognition module for receiving responses and/or commands from users. The voice-recognition module can be stored in the memory 106 and executed by the processor 104, for example. Alternatively, the hub 100 could send the query to a remote server 120, which pushes the query to the user's mobile device 116 via the app running on the user's mobile device 116. The user's response is then sent back to the remote server 120 and transmitted to the hub 100. Also, the user could respond to audible queries from a voice-controlled intelligent personal assistant device 118, with the voice responses from the user captured by the voice-controlled intelligent personal assistant device 118, processed by a remote server(s) 120, and transmitted to the hub 100.

The hub 100 can then determine whether the group identified by the user's response to the query corresponds to a preexisting group. In one aspect, the hub 100 can be programmed to recognize when a response by the user is equivalent to a stored group. For example, if a user responds that the smart light device 111 is located in the family room and the hub 100 has stored a living room group but not a family room group, the hub 100 can be programmed (e.g., via the software instructions in the memory 106) to recognize that the family room answer provided by the user is equivalent to the living room group and assign the smart light device 111 accordingly. In such an aspect, the hub 100 can store lists of words or phrases that are considered to be equivalent to each other in the memory 106 and compare answers or commands to the stored lists to determine equivalency.

If the newly connected smart light device 111 does correspond to a preexisting or active group, then, at a third step 206, the hub 100 can control the smart light device 111 according to the corresponding control profile for the group. In one aspect, the hub 100 can control smart light devices 111 by assigning entries for parameters in a database record for the smart light device 111 that correspond to the group for which the smart light device 111 has been assigned. The database records for the various smart light devices 111 that are connected to the hub 100 can be stored, for example, in the memory 106. An illustrative data structure for storing control parameters, such as the group to which a given smart light device 111 is assigned, is show in Table 1 and discussed in greater detail below.

If the newly connected smart light device 111 does not correspond to a preexisting or active group, then, at a fourth step 208, the hub 100 can activate a new group and then, at a fifth step 210, assign the smart light device 111 to the newly created group. In one aspect, the hub 100 can activate a new group my retrieving a group identity from a stored list of inactive or non-enabled groups. An inactive group list can correspond to a list of preset or preprogrammed group types that the hub 100 has been programmed to be able to control but that are not currently in active use in the given network. For example, a hub 100 can include preset or preprogrammed kitchen, bedroom, and living room groups. If the kitchen group is currently inactive or otherwise does not have any smart light devices 111 assigned to it and then a smart light device 111 corresponding to the kitchen group connects to the hub 100, the hub 100 can, at the fourth step 208, activate the kitchen group (and its corresponding parameter settings or profile) and then, at the fifth step 210, assign the newly connected smart light device 111 to the newly activated kitchen group. Once assigned to the newly created group, the hub 100 can, at a sixth step 212, control the newly connected smart light device 111 according to the control profile corresponding to the new group, as discussed above with respect to the third step 206. The hub 100 can control the newly connected smart light device 111 according to the assigned control profile by, for example, populating the fields of the database entry corresponding to the smart light device 111 with the template values associated with the assigned control profile. In another aspect, at the fourth step 208, the hub 100 can alternatively create a new group and prompt the user to provide the group name and/or parameter settings for the control profile applied to smart light devices 111 that are subsequently assigned to that group.

By executing the illustrated process 200, the hub 100 can define a master control for a location such that each smart light device 111 associated with that location can be controlled jointly (e.g., on a room-by-room basis). Accordingly, each smart light device 111 that is subsequently connected to the hub 100 is configured to automatically operate with a series of default parameters, without the need for users to set or adjust any configuration settings, other than simply stating where the smart light device 111 is located. The process 200 is thus beneficial because it greatly reduces the amount of effort to configure each smart light device 111 as it is connected to the local network. Furthermore, by jointly operating all of the smart light devices 111 associated with a given location, the hub 100 can trigger several actions by only issuing a single command (e.g., a command to "dim the living room" can jointly reduce the brightness of each of the smart light devices 111 assigned to the living room group).

FIGS. 6A and 6B are a logic flow diagram of another process 600 for configuring a smart light device 111, in accordance with at least one aspect of the present disclosure. Various steps or aspects of the process 600 can be utilized on conjunction with or in lieu of the steps of the process 200 described above. A hub 100 executing the process 600 to configure a smart light device 111 can advance through the setup process by asking the user a series of queries about the smart light device 111. The user's answers to the queries can dictate which control profile(s) are assigned to the smart light device 111 and how the hub 100 controls the smart light device 111. The queries can be presented to the user via a speaker or another I/O device 108 associated with the hub 100, a voice-controlled intelligent personal assistant device 118 coupled to the hub 100, and so on.

Accordingly, at a first step 602, a hub 100 executing the process 600 determines whether a newly connected smart light device 111 is positioned outdoors or indoors. As noted above, the hub 100 can make this determination and other determinations described below by querying the user. If the user indicates that the smart light device 111 is outdoors, then, at a second step 604, the hub 100 can assign the smart light device 111 to the outdoor control group and apply the corresponding outdoor control profile. The outdoor control profile can cause, for example, the hub 100 to activate the smart light device 111 at sunset and deactivate the smart light device 111 at sunrise.

If the user indicates that the smart light device 111 is indoors, then, at a third step 606, the hub 100 can determine which floor of the building the smart light device 111 is located on and determine whether that floor has a preexisting control profile associated with it. If the floor does have a preexisting control profile, then, at a fourth step 608, the hub 100 can assign the smart light device 111 to the appropriate floor control group and apply the corresponding floor control profile. If the floor does not have a preexisting control profile, then, at a fifth step 610, the hub 100 can create a control group for the floor, create a control profile for the newly created floor control group, and assign the smart light device 111 to the newly created floor control group and apply the control profile.

Accordingly, the hub 100, at a sixth step 612, can determine which room type the smart light device 111 is located in (e.g., bedroom, kitchen, or living room) and determine whether the room has a preexisting control profile associated with it. If the room does have a preexisting control profile, then, at a seventh step 614, the hub 100 can assign the smart light device 111 to the appropriate room control group and apply the corresponding room control profile. If the room does not have a preexisting control profile, then, at an eighth step 616, the hub 100 can create a control group for the room, create a control profile for the newly created room control group, and assign the smart light device 111 to the newly created room control group and apply the control profile. In one aspect, the newly created room control profile can set various parameters for controlling the smart light device 111 to a set of default values. For example, the control profile for the newly created room control group can set the off, low, medium, and on brightness values for the smart light device 111 to a set of default values and/or set modes (e.g., auto brighten or auto dim) for the smart light device 111 to defaults.

Once the smart light device 111 has been assigned to a control group or a series of control groups, the hub 100 can, at a series of steps 618, determine whether various modes should be implemented for the smart light device 111. These modes can include, for example, whether the user wishes the smart light device 111 to function as a nightlight, whether the smart light device 111 should be controlled according to an away mode, whether the smart light device 111 is along an exit path, whether the smart light device 111 is along a bedroom path, whether the smart light device 111 should be controlled as part of a "good morning" and/or "welcome home" group, and so on. Each of these modes is discussed in greater detail below under the heading "Control Profile Parameters and Modes."

Control Profile Parameters and Modes

Each smart light device 111 can be independently controlled by the hub 100 according to a variety of parameters. These parameters can include settings for particular functions of the smart light devices 111 (e.g., brightness) or whether the smart light devices 111 are to be controlled according to various modes executed by the hub 100.

In one aspect, the hub 100 can store a variety of different brightness values depending on the time of day (e.g., daytime or nighttime) and desired intensity (e.g., low, medium, or on/high) in the database entry for each smart light device 111 (or groups or smart light devices 111). The brightness values can define the relative or absolute brightness of the light emitted by the smart light device 111 (or the light controlled thereby). For example, the brightness values can be represented by a level (e.g., 8 out of 10 for the daytime medium brightness in Table 1) or a percentage of the maximum brightness capable of being output by the light bulb of the smart light device 111. In one aspect, the hub 100 can select the brightness of the light emitted by the smart light device 111 according to an instruction from a user regarding a desired intensity and the time of day. For example, if a user issues a command to set a low brightness level for a particular smart light device 111 (or group of smart light devices 111) and the current time is during the day, then the hub 100 can retrieve the daytime low brightness value from the database entry for each smart light device 111 and set each smart light device 111 to that value. Alternatively, if the user issues a command to set a low brightness value during nighttime, the hub 100 can instead retrieve the nighttime low brightness value. In one aspect, the daytime and nighttime time ranges can be set by a user or received from an external source to which the hub 100 is communicably connected based on geographic location of the hub 100, time of year, and other variables.

As is illustrated in Table 1, the off brightness values need not necessarily be set to a brightness value of 0%, i.e., the light being completely off. This can be beneficial for lights where it would be desired to maintain some threshold level of illumination at night, such if the light serves as a nightlight for a child. In one aspect, the nighttime off value can be adjustable by a user and the daytime off value can be nonadjustably set to zero illumination. In one aspect, if a smart light device 111 is set to its daytime off brightness value at the designated time when the daytime period ends and the nighttime period begins, the hub 100 can automatically switch the smart light device 111 to its nighttime off brightness value.

In one aspect, the hub 100 can also store other parameters associated with each of the smart light devices 111. For example, the parameters can further include a color temperature to be emitted by the smart light device 111, which can be represented in kelvins or appearance levels (e.g., warm white) that can correspond to ranges of color temperatures. In aspects where the smart light devices 111 can include color-adjustable lights, the parameters can further include a color of the light.

In various aspects, the database entries for each of the smart light devices 111 connected to the hub 100 can include parameters indicating whether one or more different modes or processes executable by the hub 100 are enabled for the smart light device 111 or additional properties of the smart light devices 111. These database entries can be textual (e.g., "Y," "enabled," "N," or "not enabled") or numerical (e.g., 1 or 0, where an entry of 1 corresponds to enabled and an entry of 0 corresponds to not enabled). These database entries can include, for example, an away mode, a sleep mode, and a wake mode, which are discussed in greater detail with respect to FIGS. 3A-5.

These database entries can also include, for example, whether the smart light device 111 is located along an exit path, is located along a bedroom path, or is preferred by users to be activated or deactivated during a particular time period (e.g., the morning or between 7:00 a.m.-9:00 a.m.). As illustrated in FIGS. 6A and 6B, the hub 100 can determine whether a smart light device 111 has these or other additional properties by querying the user during the configuration process for the smart light device 111. These additional properties assigned to the smart light devices 111 can be utilized to execute intelligent controls of the smart light devices 111. For example, when the occupants issue a command to deactivate the lighting system (e.g., because they are leaving the building), the hub 100 can immediately deactivate each of the connected smart light devices 111, except for any smart light devices 111 that are marked as being along an exit path. Instead, the hub 100 can be programmed to delay the deactivation of the exit path smart light devices 111 for a predetermined period of time (e.g., 90 seconds). The exit path smart light devices 111 can be located near one or more exits of the building or along a path from a particular location in the building to one or more designated exits. In this example, delaying the deactivation of the exit path lights can provide illumination to the users as they leave the building after giving the deactivation command.

As another example, similar to the exit path example discussed above, the hub 100 can be programmed to delay the deactivation of the smart light devices 111 marked as bedroom path lights for a predetermined period of time (e.g., 90 seconds) when a user has issued a command to deactivate the lighting system (e.g., because they are going to bed). The bedroom path smart light devices 111 can be located near one or more bedrooms or along a path from a particular location in the house to one or more designated bedrooms (or, in some aspects, another room type). In this example, delaying the deactivation of the bedroom path lights can provide illumination to the users as they proceed to their bedrooms after giving the deactivation command.

In additional examples, the hub 100 can be programmed to automatically activate or deactivate particular smart light devices 111, which can be located in the same or different rooms at different times of day. For example, the hub 100 can store a parameter indicating whether the users prefer each smart light device 111 to be activated during the morning, i.e., is assigned to the "good morning" control group, as illustrated in FIG. 6B, or has the "morning light" parameter enabled, as illustrated in Table 1. Accordingly, the hub 100 can be programmed to automatically activate the morning lights at a particular time (e.g., 7:00 a.m.). As another example, the hub 100 can store a parameter indicating whether the users prefer each smart light device 111 to be activated when the users return home, i.e., is assigned to the "welcome home" control group, as illustrated in FIG. 6B. Accordingly, the hub 100 can be programmed to automatically activate such lights at a particular time (e.g., 5:00 p.m.). These preferences and the associated activation times for the smart light devices 111 can be set by the user or learned and enabled by the hub 100 through machine-learning techniques, for example. As yet another example, the hub 100 can be programmed to activate or deactivate smart light devices 111 that are labeled as being located outdoors according to the time of day. In one implementation, the hub 100 can automatically activate the outdoor smart light devices 111 at or within a threshold time period of sunset (e.g., 30 minutes before sunset or 60 minutes after sunset) and automatically deactivate outdoor smart light devices 111 at or within a threshold time period of sunrise (e.g., 30 minutes before sunrise or 60 minutes after sunrise), at another predetermined time (e.g., midnight or 4:00 a.m.), or after a predetermined duration (e.g., four hours after having been activated or four hours after sunset). The hub 100 can know about the dawn and sunset times for each particular day from a remote server 120 that publishes such data to the hub 100.

As depicted in Table 1, the database entries can also include parameters indicating whether the smart light device 111 corresponding to each given entry should be controlled via various modes that correspond to other processes or control logic executed by the hub 100. These modes can include, for example, an away mode, a sleep mode, and a wake mode. Example processes for these modes are illustrated in FIGS. 3A-5. As described above in connection with FIG. 2, these processes can be embodied as instructions that can be executed by a processor 104 of the hub 100, for example.

For example, FIG. 3A is a logic flow diagram of a process 300 for controlling a smart light device 111 according to an away mode, in accordance with at least one aspect of the present disclosure. The away-mode process 300 periodically activates enabled smart light devices 111 when the building that the hub 100 is associated with is unoccupied to provide the appearance that the building is occupied. As burglars tend to target unoccupied buildings, providing the appearance that the building is occupied can deter would-be criminals. Accordingly, at a first step 302, the hub 100 determines whether the away or vacation mode has been activated. The away mode can be activated, for example, by receiving a command from a user via an I/O device 108 instructing the hub 100 to activate the away mode (e.g., a verbal command received via a speaker associated with the hub 100 or a selection input via a mobile electronic device, such as a tablet computer connected to the hub 100) when an alarm system for the building that the hub 100 can be communicably connected to has been activated or when an intelligent sensor system (e.g., motion sensors) that the hub 100 can be communicably connected to senses that the building is unoccupied.

If the away mode is not activated, then, at a second step 304, the hub 100 can operate normally (i.e., the hub 100 can continue controlling the connected smart light devices 111 according to any other processes being executed). If the away mode is activated, then, at a third step 306, the hub 100 can determine whether the current time is during a defined activation time period. In one aspect, the activation time period can be between sunset and a defined end time (e.g., an end time that approximates a reasonable bedtime, such as 11:00 p.m.-1:00 a.m.). In one aspect, the hub 100 can determine the current time via an internal clock or by retrieving the time from an external source to which the hub 100 is communicably connected (e.g., from a time server or another remote computer system to which the hub 100 is synchronized via a network synchronization protocol, such as Network Time Protocol). The hub 100 can then compare the current time to a sunset time that, for example, has been preset by the user to a static time (e.g., 6:00 p.m.) or has been retrieved from an external source that updates the sunset time based on the given geographic location of the hub 100 and the date.

If it is not during the defined activation time, then, at the second step 304, the hub 100 operates normally. If it is during the defined activation time, then, at a fourth step 308, the hub 100 determines whether the building (or a portion thereof) is occupied, i.e., whether the presence of an individuals has been detected. For example, the hub 100 can determine whether any devices (e.g., smart light devices 111) have been manually triggered within a particular threshold time (e.g., since the away mode was activated). If a device has been manually triggered, then that can indicate that the homeowners have returned and that the hub 100 should thus automatically deactivate the away mode. As another example, the hub 100 can be communicably coupled to a sensor assembly that is configured to detect the presence of users, and the hub 100 can thus determine whether any individuals are present within the building via the sensor assembly. The sensor assembly can include one or more sensors that are positioned in or around the building, such as motion sensors (e.g., infrared sensors and/or video cameras).

If the hub 100 determines that the building is occupied, then, at the second step 304, the hub 100 operates normally. If the hub 100 determines that the building is not occupied, then, at a fifth step 310, the hub 100 determines which of the smart light devices 111 connected to the hub 100 in the local network have been enabled for or assigned to the away mode. In one aspect, the hub 100 can make this determination by reviewing the database entries, such as the illustrative data structure illustrated in Table 1, that correspond to all of the connected smart light devices 111 and recording which of the smart light devices 111 have an enabled entry (e.g., "Y" or an equivalent entry) for the away mode field. After determining which of the connected smart light devices 111 are enabled for the away mode, the hub 100, at a sixth step 312, can periodically activate one or more of the enabled smart light devices 111 for random or preset periods of time in order to simulate an individual being present within the building. The hub 100 can then continue this loop of periodically activating the enabled smart light device(s) 111 until the current time is no longer within the activation time or the hub 100 determines that the building is now occupied.

In one aspect, the hub 100 can execute the away-mode process 300 for a defined period of time. In another aspect, when the process 300 ends (e.g., when a smart light device 111 is manually activated or if the defined time period for the process 300 ends), the hub 100 can be programmed to turn off any of the smart light devices 111 that have been activated as a result of the away-mode process 300 to prevent the smart light devices 111 from inadvertently being left on indefinitely.

FIG. 3B illustrates a logic flow diagram for another process 350 for controlling a smart light device 111 according to an away mode, in accordance with at least one aspect of the present disclosure. Although the process 350 is organized differently than the process 300 illustrated in FIG. 3A, many elements of the processes 300, 350 are similar. In particular, when the away mode is activated, the process 350 determines whether the current time is within the activation time assigned to the away mode, determines whether individuals are present within the building, and periodically activates the smart light devices 111 that have been assigned to the away mode, similar to the process 300 described above. However, in this aspect, the process 350 includes a step 352 where the hub 100, after the away mode is activated (e.g., by receiving a vocal command from a user to activate the away mode), delays the initiation of the remaining steps of the process 350 for a predetermined time period (e.g., 30 seconds or two minutes). This can be useful in order to, for example, provide the user with a sufficient amount of time to exit the building before the process 350 begins monitoring for the presence of individuals within the building, thereby preventing the process 350 from quickly deactivating after the user initiates the process 350. The process 350 can also include a step 354 where the hub 100, after the away mode is deactivated either due to an individual being detected or the activation time period ending, deactivates any smart light devices 111 that were activated as a result of the process 350. This can be useful in order to, for example, ensure that any smart light devices 111 activated as part of the away mode are not left on after the activation time period ends.

Figure 4:
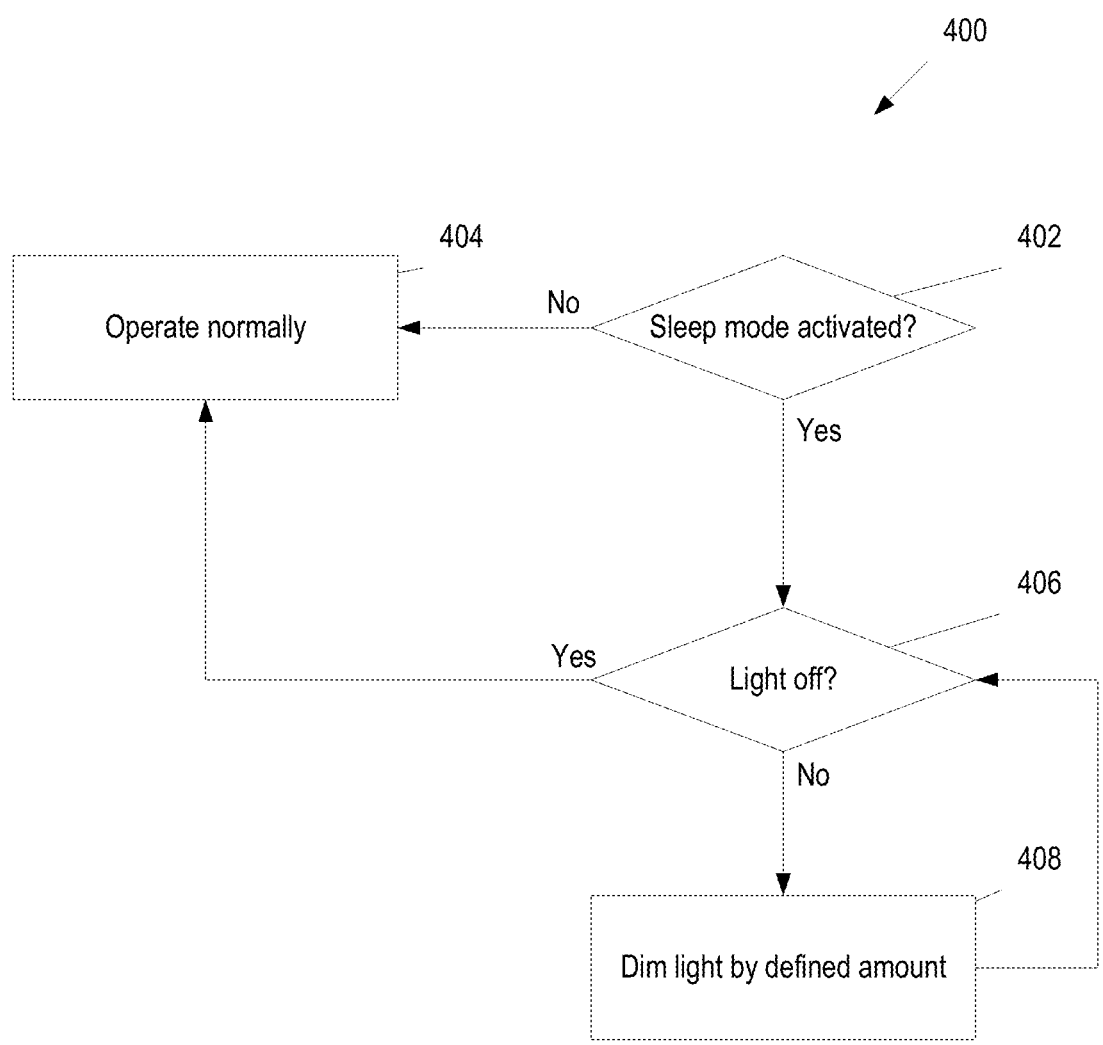
FIG. 4 is a logic flow diagram of a process for controlling a smart light device according to a sleep mode, in accordance with at least one aspect of the present disclosure.

As another example, FIG. 4 is a logic flow diagram of a process 400 for controlling a smart light device 111 according to a sleep mode, in accordance with at least one aspect of the present disclosure. The sleep-mode process 400 gradually dims a smart light device 111 until the smart light device 111 is completely deactivated.

Accordingly, at a first step 402, the hub 100 determines whether the sleep mode is activated for a given smart light device 111 that is connected to the hub 100. In one aspect, the hub 100 can make this determination by retrieving the database entry that corresponds to the particular smart light device 111 and determining whether the smart light device 111 has an enabled entry for the sleep-mode data field. The hub 100 can update the database entry to activate the sleep mode for a given smart light device 111 by receiving a command from a user via an I/O device 108 instructing the hub 100 to activate the sleep mode (e.g., a verbal command received via a speaker associated with the hub 100 or a selection input via a mobile electronic device, such as a tablet computer, connected to the hub 100) or when an intelligent sensor system (e.g., motion sensors) that the hub 100 can be communicably connected to senses that there has been no activity or motion by an occupant of the room within a defined threshold time period comparing it to the threshold brightness value, for example.

If the sleep mode is not activated for the given smart light device 111 then, at a second step 404, the hub 100 can operate normally (i.e., the hub 100 can continue controlling the connected smart light devices 111 according to any other processes being executed). If the sleep mode is activated, then, at a third step 406, the hub 100 can determine whether the light is completely off or deactivated. The hub 100 can make this determination by retrieving the current illumination value or level at which the smart light device 111 is set and comparing it to the minimum or "off" brightness value (which may not necessarily be a brightness of 0%, as discussed above), for example.

If the light is off then, at a second step 404, the hub 100 can operate normally. If the light is not off, then the hub 100 can, at a fourth step 408, control the smart light device 111 to dim the light by a particular amount (e.g., 5%, one illumination level, or 100 lumens). The amount by which the light is dimmed can be a value that is set by the user, preprogrammed, or calculated algorithmically by the hub 100. In one aspect, the hub 100 can implement a time delay (e.g., five minutes) between the third step 406 and the fourth step 408 in order to gradually dim the light.

Figure 5:
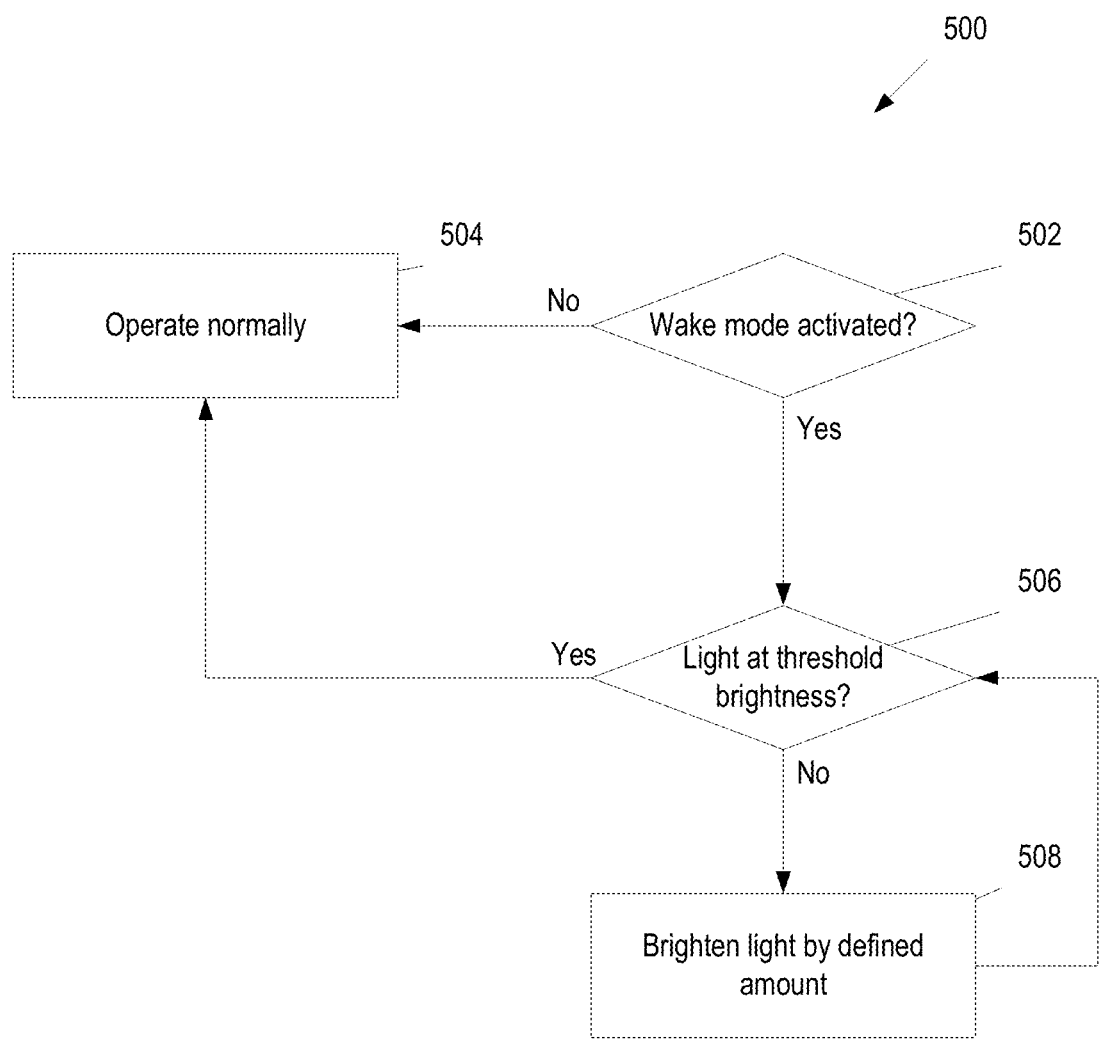
FIG. 5 is a logic flow diagram of a process for controlling a smart light device according to a wake mode, in accordance with at least one aspect of the present disclosure.

As yet another example, FIG. 5 is a logic flow diagram of a process 500 for controlling a smart light device 111 according to a wake mode, in accordance with at least one aspect of the present disclosure. The wake-mode process 500 gradually brightens a smart light device 111 until the smart light device 111 is completely deactivated.

Accordingly, at a first step 502, the hub 100 determines whether the wake mode is activated for a given smart light device 111 that is connected to the hub 100. In one aspect, the hub 100 can make this determination by retrieving the database entry that corresponds to the particular smart light device 111 and determining whether the smart light device 111 has an enabled entry for the wake-mode data field. The hub 100 can update the database entry to activate the wake mode for a given smart light device 111 by receiving a command from a user via an I/O device 108 instructing the hub 100 to activate the wake mode (e.g., a verbal command received via a speaker associated with the hub 100 or a selection input via a mobile electronic device, such as a tablet computer connected to the hub 100) or according to a schedule that the hub 100 has been programmed to initiate the wake mode according to, for example.

If the wake mode is not activated for the given smart light device 111, then, at a second step 504, the hub 100 can operate normally (i.e., the hub 100 can continue controlling the connected smart light devices 111 according to any other processes being executed). If the wake mode is activated, then, at a third step 506, the hub 100 can determine whether the light is at a threshold brightness. The hub 100 can make this determination by retrieving the current illumination value or level at which the smart light device 111 is set, for example, and comparing it to the threshold brightness value. The threshold brightness can include the daytime low brightness, daytime medium brightness, daytime on brightness, or another brightness selected by a user.

If the light is at the threshold brightness, then, at a second step 504, the hub 100 can operate normally. If the light is not at the threshold brightness, then the hub 100 can, at a fourth step 508, control the smart light device 111 to increase the brightness of the light by a particular amount (e.g., 5%, one illumination level, or 100 lumens). The amount by which the light is brightened can be a value that is set by the user, preprogrammed, or calculated algorithmically by the hub 100. In one aspect, the hub 100 can implement a time delay (e.g., five minutes) between the third step 506 and the fourth step 508 in order to gradually increase the brightness of the light.

As noted above, the values or settings for the various parameters for controlling each smart light device 111 can be set to template values associated with a control profile or be individually changed by a user (e.g., via a voice command issued to the hub 100). In one aspect, the hub 100 can query users as to whether the users have any preferred settings that they wish to apply to all of the smart light devices 111 that are associated with a particular control group or all of the smart light devices 111 that connected to the hub 100. If the user does wish to set a setting for a set of smart light devices 111, the hub 100 can then change that setting as applied to each smart light device 111 (e.g., update that particular field in the database entry for each smart light device 111) indicated by the user. For example, the user can command the hub 100 or respond to a query from the hub 100 to cause the hub 100 to turn off all of the smart light devices 111 that are part of the nightlight control group at 2:00 a.m. As another example, the user can command the hub 100 or respond to a query from the hub 100 to set a global setting to cause the hub 100 to turn off all of the smart light devices 111 connected to the hub 100 at 2:00 a.m.

In one aspect, the hub 100 can be programmed to designate particular parameters or settings as "critical" or requiring user approval before any changes to the parameters or settings are implemented by the hub 100. Accordingly, when an algorithm or process executed by the hub 100 would seek to adjust a parameter or setting associated with one or more smart light devices 111, the hub 100 can query the user to obtain approval before implementing the change. For example, adding a smart light device 111 to a new control group can be designated as a non-critical change that the hub 100 can make without obtaining user approval; however, setting a smart light device 111 to automatically activate to a low brightness in the evening (i.e., serve as a nightlight) can be designated a critical change that the hub 100 cannot make without obtaining user approval.

Smart Lighting Control System Inventory and Installation App

An app can be provided that assists users in installing a hub 100 and a smart lighting system 110. The app can include a smartphone application, a web application, and so on. In one aspect, the app can be programmed to guide a user through the process of inventorying the outlets and light switches in the user's building. As part of the inventorying process, the user can indicate which outlets and/or light switches are smart or "dumb" devices. Based on the resulting inventory, the app can indicate which devices can or should be upgraded to smart light devices 111. Further, each user of the app can have a unique user account for tracking and storing the input provided by the user during the inventorying process. In one aspect, a user can associate their user account with the hub 100. Accordingly, the hub 100 can retrieve the inventory associated with the user account from a server database (e.g., a remote server 120) and then utilize the inventory during the process of connecting new smart light devices 111 to the hub 100. In one aspect, the hub 100 can anticipate the number and types of smart light devices 111 that will need to be connected to the hub 100 and prompt the user to connect a particular smart light device 111 to the hub 100 at particular times. If the retrieved inventory sets forth the location or control group with which each smart light device 111 is associated, the hub 100 can automatically assign the relevant control profile to each smart light device 111 as it is connected to the hub 100 in response to prompts from the hub 100 without the need for the user to answer any queries pertaining to the location or other information associated with the smart light device 111 (because the hub 100 will already have that information). For example, a user could log into their user account on the hub 100 when initially activating the hub 100. The hub 100 could then access a remote server 120 and retrieve the account details associated with the user account, including an inventory of the user's home that was previously performed by the user via the aforementioned app. Based on the received inventory, the hub 100 can then request that the user pair a particular smart light device 111 (e.g., for a first-floor kitchen light) to the hub 100. The user can then pair that smart light device 111 to the hub 100, and the hub 100 can then assign the newly connected smart light device 111 to the appropriate group and apply the corresponding control profile for that group. In another aspect, the hub 100 can compare the smart light devices 111 connected with the hub 100 to the inventory provided by the app and determine whether any remaining smart light devices 111 have not yet connected to the hub 100 or have failed to connect to the hub 100.

In another aspect, the app can also guide the user through the process of identifying how many smart light devices 111 they may need in the building (which make be different than the total number of light switches and outlets). In yet another aspect, the app can include or link to a webstore selling smart light devices 111 and other hardware that the application determines that the user may need as a result of completing an inventory of his or her building. As yet another aspect, the app can provide users with an installation guide based on the results of the inventorying. The installation guide can be utilized by either the user or a professional installer to utilize when installing the hub 100 and/or smart lighting system 110 in the building. The installation guide can set forth, for example, the number, arrangement, and/or suggested locations for all of the smart light devices 111 for installation thereof.

Hub Implementation with Smart Devices

In one aspect, the hub 100 can be programmed to control or limit the amount and type of information pertaining to the hub 100 or smart lighting system 110 that is accessible by a virtual assistant (e.g., as implemented by a voice-controlled intelligent personal assistant device 118) connected to the hub network. For example, the hub 100 can allow a virtual assistant to collectively control all of the smart light devices 111 that are assigned to the kitchen group, but may not allow the virtual assistant to view or control the kitchen-assigned smart light devices 111 individually. This can be useful in order to, for example, simplify the control and programming of the smart light devices 111 through a virtual assistant.

In another aspect, the hub 100 can be programmed to maintain a reference list of all of the commands that each different type of virtual assistant is able to understand so that the hub 100 is able to understand commands provided by the virtual assistant and, in turn, relay information to the virtual assistant. The hub 100 can further be programmed to receive updates to the reference lists of virtual assistant-compatible commands from a remote server 120 to which the hub 100 is connected.

Hub Structure

The hub 100 may comprise one or more processors (e.g., CPUs or GPUs), primary data storage or memory (i.e., memory that is directly accessible to the CPUs/GPUs, such as RAM, ROM, registers, cache memory), secondary data storage (i.e., data storage that is not directly accessible by the CPUs/GPUs, such as HDDs, flash, SSDs, etc.), nearline and/or off-line storage. The hub 100 may be programmed to perform the functions described herein with software that is stored in the primary, secondary, nearline, and/or off-line data storage and executed by the processor(s) of the hub 100. The computer software may be implemented using any suitable computer programming language, such as .NET, C, C++, JavaScript, Python, Ruby, Lua, and Perl, and using conventional, functional, or object-oriented techniques. Programming languages for computer software and other computer-implemented instructions may be translated into machine language by a compiler or an assembler before execution and/or may be translated directly at run time by an interpreter.

Examples

Various aspects of the subject matter described herein are set out in the following aspects, implementations, and/or examples, which can be interchangeably combined together in various combinations:

In once aspect or implementation, the present disclosure is directed to a method for configuring smart light devices. The method comprises the steps of receiving, by a hub, a connection from a first smart light device and then determining, by the hub, whether the first smart light device corresponds to a first group. Upon a determination that the first smart light device corresponds to the first group, the method further comprises the steps of assigning, by the hub, the first smart light to a first light control profile corresponding to the first group and controlling, by the hub, the first smart light device according to the first light control profile.

In one aspect or implementation of the aforementioned method, the first light control profile is configured to control a lighting parameter selected from a group including brightness, color temperature, activation schedule, and color of light emitted by the first smart light device.

In one aspect or implementation, the aforementioned method further includes: receiving, by the hub, a connection from a second smart light device; determining, by the hub, whether the second smart light device corresponds to the first group; upon determining that the second smart light device does not correspond to the first group, assigning, by the hub, the second smart light to a second light control profile corresponding to a second group; and controlling, by the hub, the second smart light device according to the second light control profile.

In one aspect or implementation of the aforementioned method, the second light control profile is configured to control a lighting parameter selected from a group including brightness, color temperature, activation schedule, and color of light emitted by the first smart light device.

In one aspect or implementation of the aforementioned method, the first group corresponds to a first room type and the second group correspond to a second room type, wherein the first room type is different from the second room type.

In one aspect or implementation of the aforementioned method, the first group corresponds to a first floor of a building and the second group corresponds to a second floor of the building, where the first floor is different from the second floor.

In another aspect or implementation, the present disclosure is directed to a smart lighting control system including any of the features recited above, including: a first smart light device configured to issue a connection signal; a database configured to store a first light control profile corresponding to a first group of smart light devices; a hub configured to communicate with the database, wherein the hub includes a transceiver and a control circuit configured to: receive the connection signal issued by the first smart light device; determine, upon receiving the connection signal, whether the first smart light device corresponds to the first group of smart light devices; and control, upon determining that the first smart light device corresponds to the first group of smart light devices, the first smart light device according to the first light control profile.

In one aspect or implementation of the aforementioned system, the first light control profile is configured to control a lighting parameter selected from a group including brightness, color temperature, activation schedule, and color of light emitted by the first smart light device.

In one aspect or implementation, the aforementioned system further includes a second smart light device configured to issue a connection signal, the database is further configured to store a second light control profile corresponding to a second group of smart light devices, and the control circuit is further configured to: receive the connection signal issued by the second smart light device; determine, upon receiving the connection signal from the second smart light device, whether the second smart light device corresponds to the first group of smart light devices; and control, upon determining that the second smart light device does not correspond to the first group of smart light devices, the second smart light device according to the second light control profile.

In one aspect or implementation of the aforementioned system, the second light control profile is configured to control a lighting parameter selected from a group including brightness, color temperature, activation schedule, and color of light emitted by the second smart light device.

In one aspect or implementation of the aforementioned system, the first group corresponds to a first room type and the second group correspond to a second room type, wherein the first room type is different from the second room type.

In one aspect or implementation of the aforementioned system, the first group corresponds to a first floor of a building and the second group corresponds to a second floor of the building, where the first floor is different from the second floor.

In one aspect or implementation of the aforementioned system, the first group corresponds to indoor lighting and the second group corresponds outdoor lighting.

In one aspect or implementation of the aforementioned system, the control circuit automatically determines that the second smart light device does not correspond to the first group of smart light devices based at least in part on the connection signal.

In one aspect or implementation, the aforementioned system further includes a mobile device configured to issue an instruction and the control circuit is further configured to: receive the instruction from the mobile device and reassign the second smart light device to the first group of smart light devices based at least in part on the received instruction.

In one aspect or implementation of the aforementioned system the control circuit is further configured to track an actual usage of the first group of smart light devices and automatically adjust the lighting parameter of the first light control profile based at least in part on the actual usage of the first group of smart light devices.

In one aspect or implementation of the aforementioned system the control circuit is further configured to track an actual usage of the first group of smart light devices, issue a prompt to the mobile device requesting authorization to adjust the lighting parameter of the first light control profile based at least in part on the actual usage of the first group of smart light devices, receive the instruction from the mobile device, and adjust the lighting parameter of the first light control profile based at least in part on the received instruction.

In one aspect or implementation, the aforementioned system further includes a remote server configured to store external data, wherein the control circuit is further configured to communicate with the remote server; and adjust the first light control profile based at least in part on the external data.

In another aspect or implementation, the present disclosure is directed to a hub including any of the features recited above, wherein the hub is configured for use with a smart lighting control system, wherein the smart lighting control system includes a first smart light device configured to issue a connection signal, a second smart light device configured to issue a connection signal, and a database configured to store a first light control profile corresponding to a first group of smart light devices and a second light control profile corresponding to a second group of smart light devices, wherein the hub includes: a transceiver; and a control circuit configured to: receive the connection signal issued by the first smart light device; determine, upon receiving the connection signal, whether the first smart light device corresponds to the first group of smart light devices; and control, upon determining that the first smart light device corresponds to the first group of smart light devices, the first smart light device according to the first light control profile; wherein the control circuit is further configured to: receive the connection signal issued by the second smart light device; determine, upon receiving the connection signal from the second smart light device, whether the second smart light device corresponds to the first group of smart light devices; and control, upon determining that the second smart light device does not correspond to the first group of smart light devices, the second smart light device according to the second light control profile.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The invention claimed is:

1. A method for configuring smart light devices, the method comprising:
   receiving, by a hub, a connection from a first smart light device;
   determining, by the hub, that the first smart light device belongs to a first group, wherein the first group comprises one or more smart light devices;
   assigning, by the hub, a first light control profile to the first group, wherein the first light control profile comprises a set of values corresponding to a set of lighting parameters, and wherein the first light control profile applies to all smart light devices in the first group;
   controlling, by the hub, the first smart light device according to the first light control profile;
   tracking, by the hub, actual usage of the first group of the one or more smart light devices;

comparing, by the hub, the actual usage of the one or more smart light devices to the first light control profile; and adjusting, by the hub, the set of lighting parameters of the first light control profile based at least in part on the actual usage of the first group of the one or more smart light devices.

2. The method of claim 1, wherein the set of lighting parameters of the first light control profile comprises brightness, color temperature, activation schedule, and color of light emitted by the first smart light device.

3. The method of claim 2, further comprising:
receiving, by the hub, a connection from a second smart light device;
determining, by the hub, the second smart light device does not belong to the first group;
assigning, by the hub, the second smart light device to a second group, wherein the second group comprises one or more smart light devices;
assigning, by the hub, a second light control profile to the second group, wherein the second light control profile comprises a set of values corresponding to a set of lighting parameters, and wherein the second light control profile applies to all smart light devices in the second group; and
controlling, by the hub, the second smart light device according to the second light control profile.

4. The method of claim 3, wherein the set of lighting parameters of the second light control profile comprises brightness, color temperature, activation schedule, and color of light emitted by the first smart light device.

5. The method of claim 4, wherein the first group corresponds to a first room type and the second group corresponds to a second room type, wherein the first room type is different from the second room type.

6. The method of claim 4, wherein the first group corresponds to a first floor of a building and the second group corresponds to a second floor of the building, where the first floor is different from the second floor.

7. The method of claim 4, wherein the first group corresponds to indoor lighting and the second group corresponds outdoor lighting.

8. The method of claim 1, further comprising:
automatically adjusting, by the hub, the lighting parameter of the first light control profile based on a determined difference between the first light control profile and the actual usage of the first group of smart light devices.

9. The method of claim 1, further comprising:
issuing, by the hub, a prompt to a mobile device to adjust the set of lighting parameters of the first light control profile based on a determined difference between the first light control profile and the actual usage of the first group of smart light devices, wherein the prompt comprises recommended adjustment values the set of lighting parameters;
receiving, by the hub, an instruction from the mobile device; and
adjusting, by the hub, the lighting parameter of the first light control profile based at least in part on the received instruction.

10. A smart lighting control system, comprising:
a first smart light device configured to issue a connection signal;
a hub comprising:
a control circuit;
at least one memory communicatively coupled to the control circuit;
a transceiver communicatively coupled to the control circuit; and
a database residing on the memory and configured to store;
instructions executable by the control circuit to:
store a first light control profile in the database corresponding to a first group of smart light devices, wherein the first light control profile comprises a set of values corresponding to a set of lighting parameters, and wherein the first light control profile applies to all smart light devices in the first group;
receive a connection signal issued by the first smart light device;
determine from the connection signal that the first smart light device belongs to the first group of smart light devices, wherein the first group comprises one or more smart light devices; and
control the first smart light device according to the first light control profile;
track actual usage of the first group of the one or more smart light devices;
compare the actual usage of the one or more smart light devices to the first light control profile; and
adjust the set of lighting parameters of the first light control profile based at least in part on the actual usage of the first group of the one or more smart light devices.

11. The system of claim 8, wherein the set of lighting parameters of the first light control profile comprises brightness, color temperature, activation schedule, and color of light emitted by the first smart light device.

12. The system of claim 11, further comprising a second smart light device configured to issue a connection signal, and wherein the control circuit is further configured to:
store a second light control profile in the database corresponding to a second group of smart light devices, wherein the second light control profile comprises a set of values corresponding to a set of lighting parameters, and wherein the second light control profile applies to all smart light devices in the second group;
receive the connection signal issued by the second smart light device;
determine from the connection signal from the second smart light device that the second smart light device does not belong to the first group of smart light devices; and
assign the second smart light device to the second group, wherein the second group comprises one or more smart light devices;
control the second smart light device according to the second light control profile.

13. The system of claim 12, wherein the set of lighting parameters of the second light control profile comprises brightness, color temperature, activation schedule, and color of light emitted by the second smart light device.

14. The system of claim 13, wherein the first group corresponds to a first room type and the second group corresponds to a second room type, wherein the first room type is different from the second room type.

15. The system of claim 13, wherein the first group corresponds to a first floor of a building and the second group corresponds to a second floor of the building, where the first floor is different from the second floor.

16. The system of claim 13, wherein the first group corresponds to indoor lighting and the second group corresponds outdoor lighting.

17. The system of claim 13, wherein the control circuit automatically determines that the second smart light device does not belong to the first group of smart light devices based at least in part on the connection signal.

18. The system of claim 17, further comprising a mobile device configured to issue an instruction, wherein the control circuit is further configured to:
   receive the instruction from the mobile device; and
   reassign the second smart light device to the first group of smart light devices based at least in part on the received instruction, wherein the first light control profile applies to the second smart light device in the first group.

19. The smart lighting control system of claim 13, wherein the control circuit is further configured to:
   automatically adjust the lighting parameter of the first light control profile based on a determined difference between the first light control profile and the actual usage of the first group of smart light devices.

20. The smart lighting control system of claim 13, further comprising a mobile device configured to issue an instruction, wherein the control circuit is further configured to:
   issue a prompt to the mobile device to adjust the set of lighting parameters of the first light control profile based on a determined difference between the first light control profile and the actual usage of the first group of smart light devices, wherein the prompt comprises recommended adjustment values the set of lighting parameters;
   receive the instruction from the mobile device; and
   adjust the lighting parameter of the first light control profile based at least in part on the received instruction.

21. The smart lighting control system of claim 13, further comprising a remote server configured to store external data, wherein the control circuit is further configured to:
   communicate with the remote server; and
   adjust the first light control profile based at least in part on the external data.

22. A hub configured for use with a smart lighting control system, wherein the smart lighting control system comprises a first smart light device configured to issue a connection signal, and a second smart light device configured to issue a connection signal, wherein the hub comprises:
   a control circuit;
   at least one memory communicatively coupled to the control circuit;
   a transceiver communicatively coupled to the control circuit; and
   a database residing on the memory and configured to store instructions executable by the control circuit configured to:
      store a first light control profile and a second light control profile in the database, wherein the first light control profile corresponds to a first group of smart light devices and the second light control profile corresponds to a second group of smart light devices, wherein the first and second light control profiles comprise a set of values corresponding to a set of lighting parameters, and wherein the first and second light control profiles apply to all smart light devices in the first and second group respectively;
      receive a connection signal issued by the first smart light device;
      determine from the connection signal of the first smart device that the first smart light device belongs to the first group of smart light devices; and
      control the first smart light device according to the first light control profile;
   wherein the control circuit is further configured to:
      receive the connection signal issued by the second smart light device;
      determine from the connection signal of the second smart device that the second smart light device does not belong to the first group of smart light devices;
      assign the second smart light device to the second group, wherein the second group comprises one or more smart light devices; and
      control the second smart light device according to the second light control profile.

23. The hub of claim 22, wherein the control circuit is further configured to:
   automatically adjust the lighting parameter of the first light control profile based on a determined difference between the first light control profile and the actual usage of the first group of smart light devices.

24. The hub of claim 22, wherein the control circuit is further configured to:
   issue a prompt to a mobile device to adjust the set of lighting parameters of the first light control profile based on a determined difference between the first light control profile and the actual usage of the first group of smart light devices, wherein the prompt comprises recommended adjustment values the set of lighting parameters;
   receive an instruction from the mobile device; and
   adjust the lighting parameter of the first light control profile based at least in part on the received instruction.

* * * * *